Patented Oct. 1, 1935

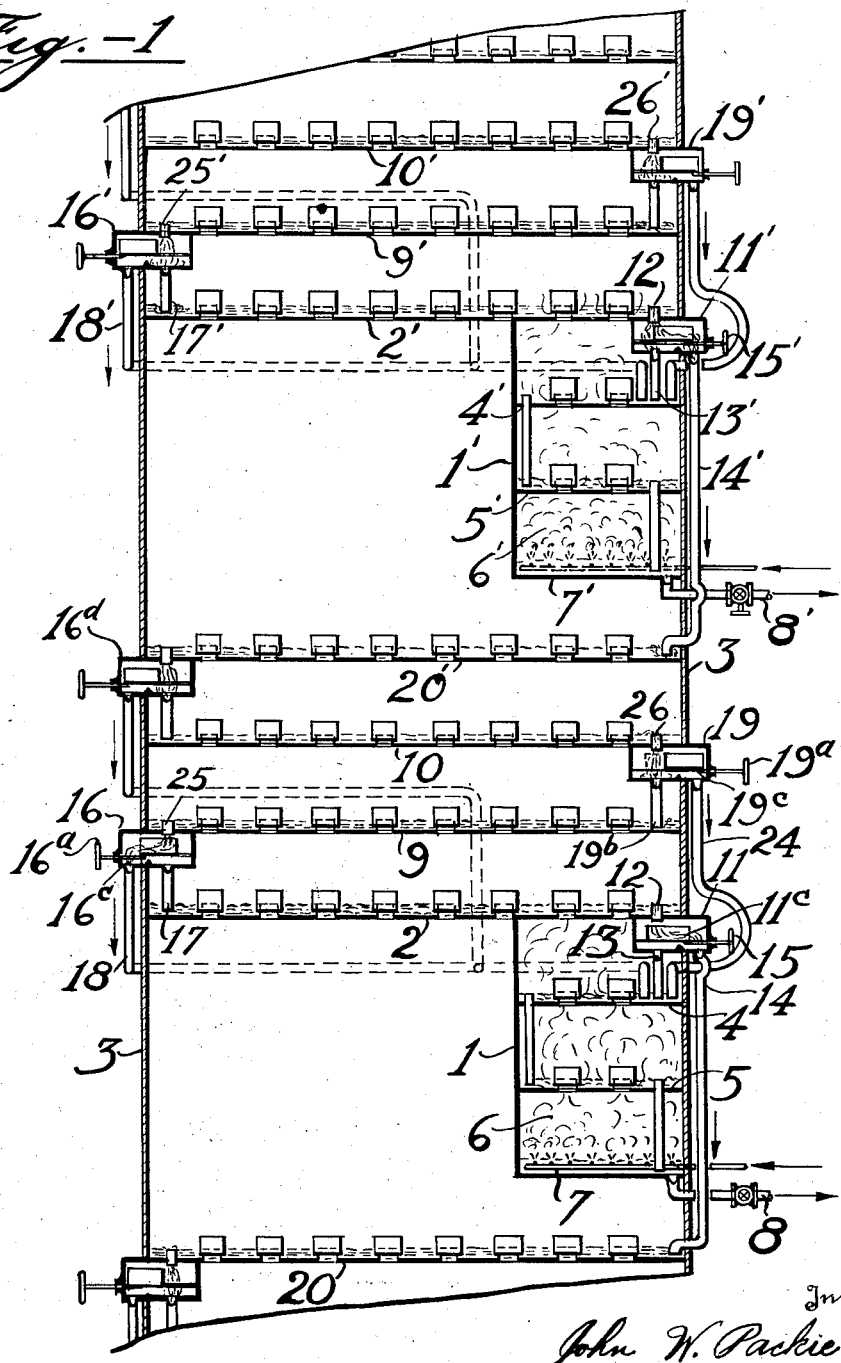

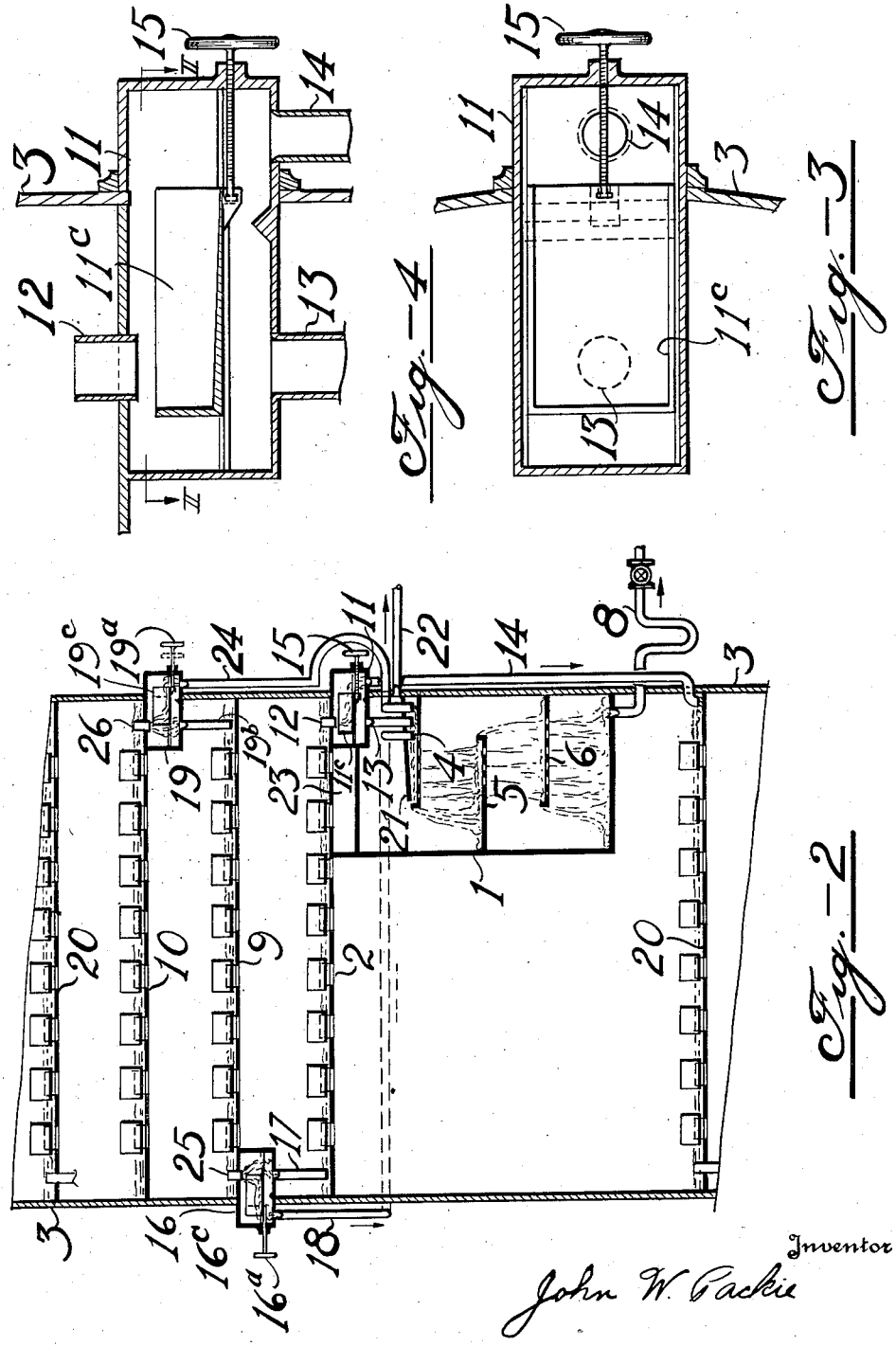

2,015,725

UNITED STATES PATENT OFFICE 2,015,725

INTERNAL STRIPPER FOR BUBBLE TOWERS

John W. Packie, Green Village, N. J., assignor to Standard Oil Development Company, a corporation of Delaware Application June 19, 1931, Serial No. 545,419

5 Claims. (Cl. 196—94)

This invention relates to the fractional distillation of a composite liquid, such as a hydrocarbon oil, especially a petroleum oil, with particular reference to improving the quality of the several fractions.

According to this invention the fractions removed as side-streams from a fractionating column are stripped of low boiling constituents, which are present due to the substantial equilibrium existing between the liquid oil on each plate and the vapor above it.

More particularly in accordance with this invention, a liquid fraction is removed from any desired point in the column and while still at a temperature near its flash point, is stripped of its low boiling constituents by counter-current treatment with a vapor or gas or by subjecting to a lower pressure.

In fractional distillation in a column of the bubble plate type, the liquid on each plate is substantially in equilibrium with the vapor leaving said plate. Therefore, while the major portion of the liquid on the lower plates is composed of high boiling constituents, there is also present an appreciable quantity of low boiling material due to the equilibrium between the liquid and the vapor. Therefore, when fractions are removed from various points in the column, there is present in each sufficient low boiling material to affect the physical properties, and in the case of mineral oils, including lubricating oils, to lower the flash point.

The object of this invention is to remove these low boiling constitutents, thereby producing a more valuable product. It is an object of this invention to strip the sidestreams in compartments integral with the tower. It is a further object of this invention to steam strip or strip by means of reduced pressure the product withdrawn from any desired plate or plates above each stripping section, in said stripping section. It is a further object of this invention to control simultaneously the ratio between the quantity of each side stream stripped and the total overflow from the plate or plates from which the said side streams are withdrawn.

For an understanding of the method and illustration of some of the forms the apparatus may take, reference is made to the accompanying drawings in which Fig. 1 is a vertical cross section of one form of apparatus suitable for carrying out the process;

Fig. 2 is a modification thereof;

Fig. 3 is a top view of overflow box arrangement; and

Fig. 4 is a sectional view of overflow box arrangement.

Referring first to Fig. 1, the stripping section 1 contains one or more plates such as 4 and 5, and an accumulating space 6 below the bottom plate 5, in which may be located the steam spray 7 in the steam stripper. The product to be stripped enters on the top plate and flows across it and down to the next plate until it reaches the accumulator space below plate 5 from which it is withdrawn by line 8. The stripping section including a housing 1 is in effect a small fractionating column disposed on the inside of the bubble tower 3, attached to the side, occupying a small area of the cross section so that it does not substantially obstruct the passage of vapors through the tower. Stripping section 1 in the drawings is shown for illustration beneath the plate 2 of the tower, but as one or more stripping sections are used in the same bubble tower, they are placed under different plates in various sections of the tower.

Plates 2, 9, and 10 above the stripping section from which it may be desired at various times to withdraw the product are equipped with large overflow boxes 11, 16, and 19. Inside of each overflow box is disposed a smaller movable overflow box open on the outside end and the top. The smaller overflow boxes 11C, 16C and 19C are moved by valves 15, 16A, and 19A to regulate the flow of the product to pipes 13, 14, 17, 18, 19b, and 24, as shown in Figs. 3 and 4. The product entering the large overflow boxes 11, 16, and 19 through pipes 12, 25, and 26, may, by means of the smaller overflow boxes be discharged to either the plate below or to the stripper. However, these overflow boxes may be any other mechanically operated devices or they may be sets of two overflow pipes each equipped with a valve.

If it is desired to withdraw the product from plate 2, the first plate above the stripping section, through the stripper, the smaller overflow box 11C is moved outwards by valve 15 from underneath the overflow pipe 12 and the product passes through large overflow box 11 through pipe 13 to the top plate 4 of the stripper 1. If it is desired to pass the product to plate 20 from plate 2 of the tower 3, the smaller overflow box is moved by valve 15 to a position underneath the pipe 12. The product entering the smaller overflow box 11C from pipe 12 flows through the open end of smaller box 11C to pipe 14 and plate 20. By adjusting the position of the smaller overflow box by valve 15 the quantity of product passing to the stripper and/or to a lower plate in tower 3 may be regulated.

If it is desired to withdraw the product from any other plate, such as plate 9, the product flowing into the large overflow box 16 through pipe 25 is passed through pipe 18 to the top plate 4 of the stripper 1 by placing the smaller overflow box in a position underneath pipe 25 by valve 16A. Or by moving smaller overflow box 16C by valve 16A outwardly away from underneath the pipe 25, the product is passed through large overflow box 16, through pipe 17, to top of plate 2. Thus by using the smaller overflow box in two different ways and regulating the position of the box a desired amount of liquid may be withdrawn from any plate and stripped in an internal stripper.

When steam or any other stripping vapor is utilized in stripping the oil in stripper section 1 as in Fig. 1, the steam is introduced at the lower part of compartment below plate 5 through steam line 7. The stripping and stripped vapors pass countercurrent to the product entering the stripping zone and pass to the main rectifying column. The resulting stripped product is removed by means of pipe 8.

When reduced pressure is employed in stripping the product as shown in Fig. 2, vacuum line 22 is used. A cover 23 is placed at the upper portion of the stripping zone 1 to close off the top of stripper 1 from the rest of column 3. Baffle plate 21 is inserted below the vapor outlet 22 and above plate 4 and the openings of reflux pipe lines 13, 18, and 24. This baffle plate 21 is inserted to avoid the entrainment of any of the desired product through the vacuum vapor line. The resulting stripped product is removed by means of pipe 8 from the bottom of the stripper. The operation is as follows:

The oil in vapor form is discharged into fractionating column 3 from a still, not shown. The desired quantity of reflux of vapors ascending through the bubble plates 2, 9 and 10 may be removed from any desirable plate by means of valve arrangements on overflow boxes 11, 16, and 19, to stripping zone 1 by means of pipes 13, 18 or 24. The product in stripping zone 1 is indirectly subjected to heat of the vapors present in the fractionating column 3. It is further subjected to stripping by passing steam through pipe line 7 to the bottom of the stripper 1 as in Fig. 1, or as in Fig. 2 by subjecting the reflux oil to reduced pressure by means of vacuum line 22. The resulting stripped product is withdrawn from the lower part of stripping zone 1 by means of pipe 8. The vapors in the steam stripper as in Fig. 1 are returned to the main fractionating column through the bubble caps on plate 2. Or as in Fig. 2, the vapors are removed by vacuum from the stripping section 1 by means of line 22. The remaining stripped oil in the stripping section in both Figs. 1 and 2 is removed from stripping column by means of pipe 8.

Any desired number of stripping and fractionating sections may be arranged in one tower. In Fig. 1 there are shown two such sections, the parts of the upper section being designated by numerals bearing primes.

The foregoing description is merely illustrative, and various changes and alternative arrangements may be made within the scope of the appended claims in which it is my intention to claim all novelty inherent in the invention as broadly as the prior art permits.

I claim:

1. A fractionating column, comprising a shell, bubble plates extending transversely of the shell, a stripping column within the shell opening at its upper end through openings of the lower plate and including a housing of lesser diameter than the shell, bubble plates extending transversely of the housing, an overflow box communicating with each plate of the shell to receive reflux, a line leading from the overflow box to the next lower plate, a line leading from the box to the upper portion of the stripping column, and means in the box for directing the flow of liquid alternatively to either line.

2. A fractionating column, comprising a shell, bubble plates extending transversely of the shell, a stripping column within the shell opening at its upper end through openings in the lower plate and including a housing of lesser diameter than the shell, bubble plates extending transversely of the housing, an overflow box communicating with each plate of the shell, a line leading from the overflow box to the next lower plate of the shell, a line leading from the box to the upper portion of the stripping column, and a trough mounted for reciprocating movement in the box to direct the flow of liquid to either line.

3. A fractionating column, comprising a shell, bubble plates extending transversely of the shell, a stripping column within the shell opening at its upper end through openings in the lower plate and including a housing of lesser diameter than the shell, bubble plates extending transversely of the housing, a pipe leading from each plate of the shell to discharge liquid to the next lower plate of the shell, an overflow box in each pipe, a line leading from the box to the upper portion of the housing, and means for directing the flow of liquid from the box alternatively through the pipe or line.

4. A fractionating column, comprising a shell, a plurality of groups of bubble plates extending transversely of the shell, a stripping column within the shell opening at its upper end through openings in the lower plate of its group and including a housing of lesser diameter than the shell, bubble plates extending transversely of the housing, an overflow pipe from each plate of the shell leading to the next lower plate of the shell, an overflow box in each pipe, a line leading from the box to the upper portion of the stripping column and means in the box for directing the flow of liquid either through the pipe or the line.

5. A fractionating column, comprising a shell, bubble plates extending transversely of the shell, a stripping column within the shell opening at its upper end through openings in a given plate and including a housing of lesser diameter than the shell, bubble plates extending transversely of the housing, an overflow pipe from the given plate leading into the upper portion of the housing, an overflow box in the housing and interposed in the overflow pipe, a line leading from the box to the next lower plate of the shell, and means for directing the flow of liquid either to the pipe or to the line.

JOHN W. PACKIE.